Figure 1:
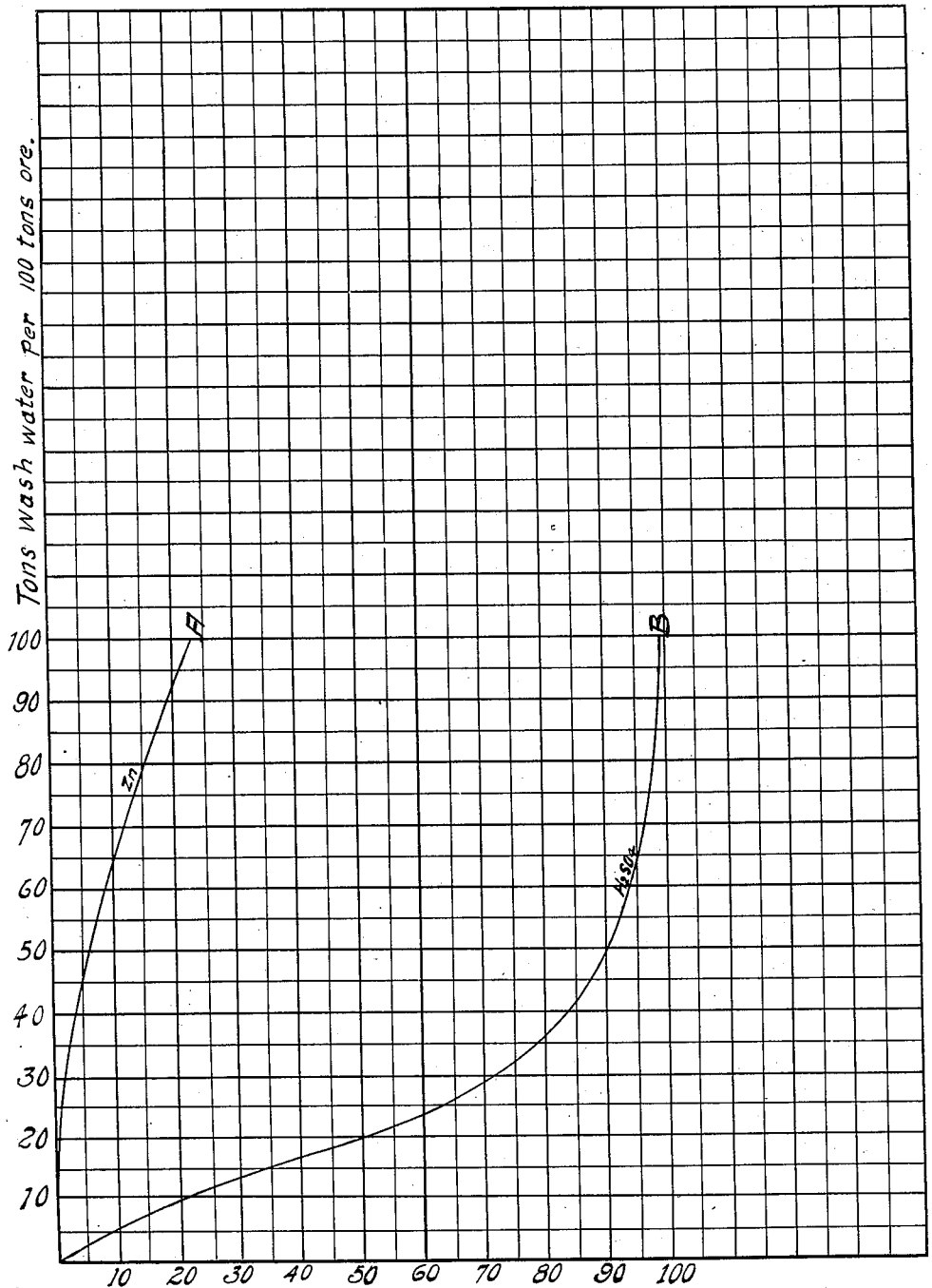

May 14, 1935. N. C. CHRISTENSEN 2,001,409
PROCESS OF TREATING ORES WITH SULPHURIC ACID
Filed Jan. 4, 1933 5 Sheets-Sheet 4

Niels C. Christensen,
INVENTOR

INVENTOR,
Niels C. Christensen.

Patented May 14, 1935

2,001,409

UNITED STATES PATENT OFFICE 2,001,409

PROCESS OF TREATING ORES WITH SULPHURIC ACID

Niels C. Christensen, Salt Lake City, Utah

Application January 4, 1933, Serial No. 650,200

27 Claims. (Cl. 23—125)

This invention relates to the treatment of ores of the common metals; such as zinc, iron, titanium and aluminum, etc., with sulphuric acid for the recovery or separation of the metals therefrom. It relates particularly to the treatment of the mixtures of sulphuric acid and metal sulphate, obtained in such processes, for the separation and recovery of the sulphuric acid and metal sulphates therefrom. It is applicable to the separation and recovery of both the sulphuric acid and the metal sulphates, from the solutions containing the acid and the metal sulphate and from the mixtures of sulphuric acid and solid metal sulphate made in such processes. As will be apparent from the following description, it is applicable in the treatment of the ores of those metals only which form water soluble sulphates which have a range of very limited solubility in relatively concentrated sulphuric acid solutions.

The invention is especially applicable in the treatment of zinc ores by the processes described in my U. S. Patents Numbers 1,434,084, 1,415,797, 1,434,086, 1,937,631, 1,937,632, and 1,937,634, and it constitutes an important and valuable improvement in these processes. It is also especially applicable in the processes of recovering zinc from sulphate solutions by electrolysis described in my copending Patents 1,937,631, 1,937,633 and 1,937,634, and it constitutes an important and valuable improvement in said processes. It is also applicable in the electrolytic processes of recovering zinc from sulphate solutions now in common use, more particularly in connection with the use of a high acid electrolysis and constitutes a valuable improvement in such processes. The invention is also applicable in the treatment of ilmenite with sulphuric acid for the recovery of the titanium and iron therefrom and especially for the treatment of the solutions of ferrous sulphate and sulphuric acid, obtained in these processes, for the recovery and separation of the acid and iron sulphate in these solutions. It constitutes an important and valuable improvement in these processes making possible the recovery and cyclic use in the process of substantially all of the sulphuric acid, both free and combined, from the final acid ferrous sulphate solutions, formed in these processes, which are now commonly a waste product, the disposal of which constitutes a serious problem in these processes. It is also applicable in the treatment of clay with $H_2SO_4$ for the recovery of the aluminum therefrom as $Al_2(SO_4)_3$ and the separation of the $SiO_2$ therefrom. It constitutes an important improvement in this process making possible a much higher recovery of aluminum therefrom and the preparation of a silica product of greater purity, and also the efficient recovery of the acid excess used in the process and optionally also the consumed acid used.

In all of the processes mentioned above, the separation of the metal sulphates and sulphuric acid from the solutions containing both the acid and the metal sulphate in solutions or from the mixtures of sulphuric acid and solid metal sulphate obtained, constitutes a problem of prime importance, and the process which solves this problem constitutes an important and valuable improvement in the processes mentioned and in combination with other steps constitutes important and valuable improvements in these processes.

The invention depends fundamentally upon the discovery that the acid in a mixture of solid metal sulphate crystals and sulphuric acid of such concentration that the solid metal sulphate is in equilibrium with this solution either as the anhydrous salt or as one of the lower hydrates of the salt, may be separated from the solid metal sulphate by washing the mixture with water in a proper manner, upon or in a suitable filtering apparatus. If properly carried out, the greater part of the acid may be washed away from the solid sulphate crystals without dissolving any considerable part of the metal sulphate. The separation is especially efficient if the acid concentration is in the range in which the solubility of the metal sulphate is near the minimum and may also be considerably improved if the washing is carried out with a neutral water solution of the metal sulphate; and also if the first part of the wash is carried out with water and the remainder of the washing operation with the neutral sulphate solution.

In theory, the process of separation depends upon the following facts: First, that there is a far greater tendency for the water to combine with the acid than with the sulphate crystals, the combination of the acid and water being very rapid and highly exothermic, whereas the hydration of the metallic sulphates is relatively slow and generates less heat. This selective action is due to the following facts: First, that the $H_2SO_4$ is in liquid form and in solution, whereas the metal sulphate is in the form of solid particles; second, that the metal sulphate crystals must be hydrated to the state of hydration in which they are in equilibrium with the solution in contact with them before solution begins; third, that the hydration of the crystals proceeding from the outer layers inward continuously withdraws water from the outer layers to supply the inner layers of the crystals, and therefore reduces the tendency of the outer layers to go into solution since they are not in a true state of equilibrium with the solution but are continuously withdrawing water from the solution. The action taking place during the washing operation is substantially as follows: The fluent mixture of acid and metal sulphate is filtered upon a suitable filter medium to remove the excess acid and form a filter cake containing the solid metal sulphate and residual acid. The wash water is then drawn or forced through the cake. As the wash liquid passes into the cake, the acid combines rapidly with the water forming an acid solution which increases in acid concentration as it passes through the cake thus displacing the acid from the inner layers of the filter cake with an acid solution which has very little tendency to hydrate or dissolve the metal sulphate. As the washing continues the acid concentration of the later portion of wash solution passing through the cake diminishes and the metal sulphate crystals begin to hydrate so as to be in equilibrium with the solution. This hydration is relatively slow and active solution begins only after the hydration has made some progress. The greater part of the acid can therefore be washed out of the metal sulphate cake without dissolving any considerable proportion of the metal sulphate. After the greater part of the acid has been removed and the washing operation has ceased, the residual wash water left in the cake is absorbed by the incompletely hydrated metal sulphate crystals causing the cake to harden and "set" in a manner similar to a gypsum plaster.

If a concentrated or saturated neutral solution of the metal sulphate is used for washing, instead of water, the action taking place during the washing operation is altered slightly as follows: As the wash solution passes into the cake, it dissolves acid, and as the acid concentration increases in the wash solution, metal sulphate is precipitated out of solution and fills the interstices left in the cake by the removal of the acid. As the wash increases in acid concentration in its passage through the cake substantially all the metal sulphate (or at least a large amount thereof) is precipitated from the wash solution leaving only acid in the solution discharged from the cake. In this case there is no considerable tendency to dissolve the metal sulphate from the cake and the greater part of the acid may be removed without dissolving any of the metal sulphate in the cake, and without the loss of any considerable amount of metal sulphate from the wash solution in the acid solution washed out of the cake. If a substantially saturated neutral metal sulphate solution is used in washing, there may be incomplete hydration of the metal sulphate in the cake, due to lack of sufficient water in the residual wash solution left in the cake. Washing with the metal sulphate solution is therefore especially efficient in the case of such sulphates as aluminum sulphate in which the change in state of hydration is less than with such sulphates as those of zinc and iron, since a more hydrated salt is preferably precipitated in order to avoid formation of acid aluminum sulphates.

The sulphates of the different metals differ somewhat in behavior during this washing treatment, due to differences in their state of hydration in contact with the different solutions and differences in the rates of hydration and solution of the different salts.

The separation of zinc sulphate and acid by the foregoing methods is a very simple and efficient operation and can be carried out with ease upon any scale from laboratory to plant scale, the sulphate filtering with ease and washing without difficulty and giving a very efficient separation of acid and metal sulphate. Iron sulphate is also separated from the acid by these methods without difficulty, but is somewhat more difficult to handle than the zinc sulphate on account of its tendency to form finer crystals and to settle into a less permeable and denser cake, thus requiring slightly more care in the handling of the acid sulphate pulp and in the filtering and washing operations. The efficiency with which the acid may be separated from the different sulphates by the methods described varies somewhat with the differences in state of hydration which the different salts undergo with changes in acid concentration and temperature of the solutions with which the salts are in contact. For example, zinc sulphate in its various stages of hydration is in equilibrium with its saturated solution in the various stages of hydration approximately as follows in neutral water solution: Below 40° C. as $ZnSO_4 \cdot 7H_2O$; between 45° C. and 80° C. as $ZnSO_4 \cdot 6H_2O$ and above 80° C. as $ZnSO_4 \cdot H_2O$. In cold $H_2SO_4$ solutions approximately as follows: Below 20% acid, as $ZnSO_4 \cdot 7H_2O$, between 20% and 40% acid $ZnSO_4 \cdot 6H_2O$, between 40% and 85% acid, $ZnSO_4 \cdot H_2O$ and above 85% as $ZnSO_4$; in hot acid solution, at the boiling point, up to 70% acid as $ZnSO_4 \cdot H_2O$, and above this concentration as $ZnSO_4$. Ferrous sulphate acts in a similar manner, for example in equilibrium with its saturated water solution: Below 45° C., as $FeSO_4 \cdot 7H_2O$; between 40° C. and 70° C., as $FeSO_4 \cdot 4H_2O$; above 70° C., as $FeSO_4 \cdot H_2O$; in contact with cold $H_2SO_4$ solutions approximately as follows: Below 45% acid, as $FeSO_4 \cdot 7H_2O$, above 45% acid, as $FeSO_4 \cdot H_2O$ (in acids of very high concentration, 90% and above, probably as $FeSO_4$); in hot acid solutions, at the boiling point, up to 75% acid, as $FeSO_4 \cdot H_2O$ and with acids of higher concentration as $FeSO_4$. Changes in the hydration of the aluminum sulphate do not take place with the same facility as with the zinc and iron sulphates. For example, the highly hydrated salt $Al_2(SO_4)_3 \cdot 18H_2O$ is in equilibrium with the saturated water solution at all temperatures up to the boiling point, and is also in equilibrium with cold $H_2SO_4$ solutions of the salt of all acid concentrations up to 75% acid, though with the acids of this and higher concentration there is some formation of hydrous acid salts. The aluminum sulphate salts precipitated from or formed in the presence of $H_2SO_4$ solutions of different concentrations, at their boiling points, decrease in the degree of hydration with increase in the acid concentration; with dilute acids the salt is $Al_2(SO_4)_3 \cdot 18H_2O$; above 30% acid, $Al_2(SO_4)_3 \cdot 12H_2O$ is formed; from 10% acid to 60% there is a progressive decrease in hydration through salts which appear to have the following compositions, $Al_2(SO_4)_3 \cdot 7H_2O$, $Al_2(SO_4)_3 \cdot 4H_2O$, $Al_2(SO_4)_3 \cdot 3H_2O$; between 60% and 70% acid, $Al_2(SO_4)_3 \cdot 2H_2O$ is formed; with acids above 60% hydrated acid salts are formed. Owing to the tendency to form acid salts, the more difficult dehydration of the salt and the slower filtering product, the separation of the $H_2SO_4$ from the aluminum sulphate, requires more careful operation of the process than is required in its separation from the zinc sulphate. Copper sulphate resembles the zinc and iron sulphates and may be separated from its mixtures with acid without difficulty by the methods described. The cupric sulphate does not dehydrate quite as readily as the zinc or iron sulphates. In contact with the saturated water solutions the salt in equilibrium up to 60° is the pentahydrate and above this temperature the trihydrate. In contact with cold $H_2SO_4$ solutions, up to 40% acid the salt in equilibrium is the pentahydrate; from 40% to 60% acid, the trihydrate; from 60% to 85% the monohydrate; and above this concentration, the anhydrous salt. In contact with hot acid solutions at their boiling points, the salt in equilibrium with solution up to 40% acid is the trihydrate, from 40% to 70%, the monohydrate, and above this concentration, the anhydrous salt. (The foregoing figures though not scientifically accurate are sufficiently accurate for the practical uses of the process.)

The accompanying curves A and B in Figure 1, show the average results secured in separating the acid and zinc sulphate in a mixture of hot 60% acid, solid zinc sulphate, and ore residue, made in the treatment of a mixed lead-zinc-iron sulphide concentrate by the sulphating process described in my patent applications No. 523,575 and No. 565,153, (now Patents 1,937,631 and 1,937,632 respectively). The cake to be washed (in a particular case) contained approximately 31% $ZnSO_4$ (solid), 31% other solids (PbSO_4, pyrite and insol.), 25% $H_2SO_4$ and 15% $H_2O$. The curves are plotted to show the amount of zinc and $H_2SO_4$ washed out of the cake with different proportions of wash water, the coordinates being tons of wash water per 100 tons of original concentrates and percentages of the total Zn and $H_2SO_4$ in the cake which is removed from the cake in the wash solution, curve A showing the percentage of the total Zn and curve B the percentage of the total $H_2SO_4$, which are removed by different amounts of wash water. It should be noted that in this case only about half of the solids in the cake is $ZnSO_4$ and that therefore the ratio of $H_2SO_4$ which is to be separated from the $ZnSO_4$ is much higher than would have been the case if the cake contained only $ZnSO_4$ as the solid portion. By reference to the curves it will be seen that 50% of the acid was removed with only one per cent of the zinc, 75% of the acid with only 2½% of the zinc, 90% of the acid with only a little over 6% of the zinc, and 95% of the acid with only 11% of the zinc and 99% of the acid with less than 25% of the zinc. The remarkable efficiency secured by the process in the separation of two soluble materials will be apparent from this example of practical results. The great value and importance of the process as applied in the processes mentioned above will be apparent from the more detailed description of its practical applications given below.

Figure 2:
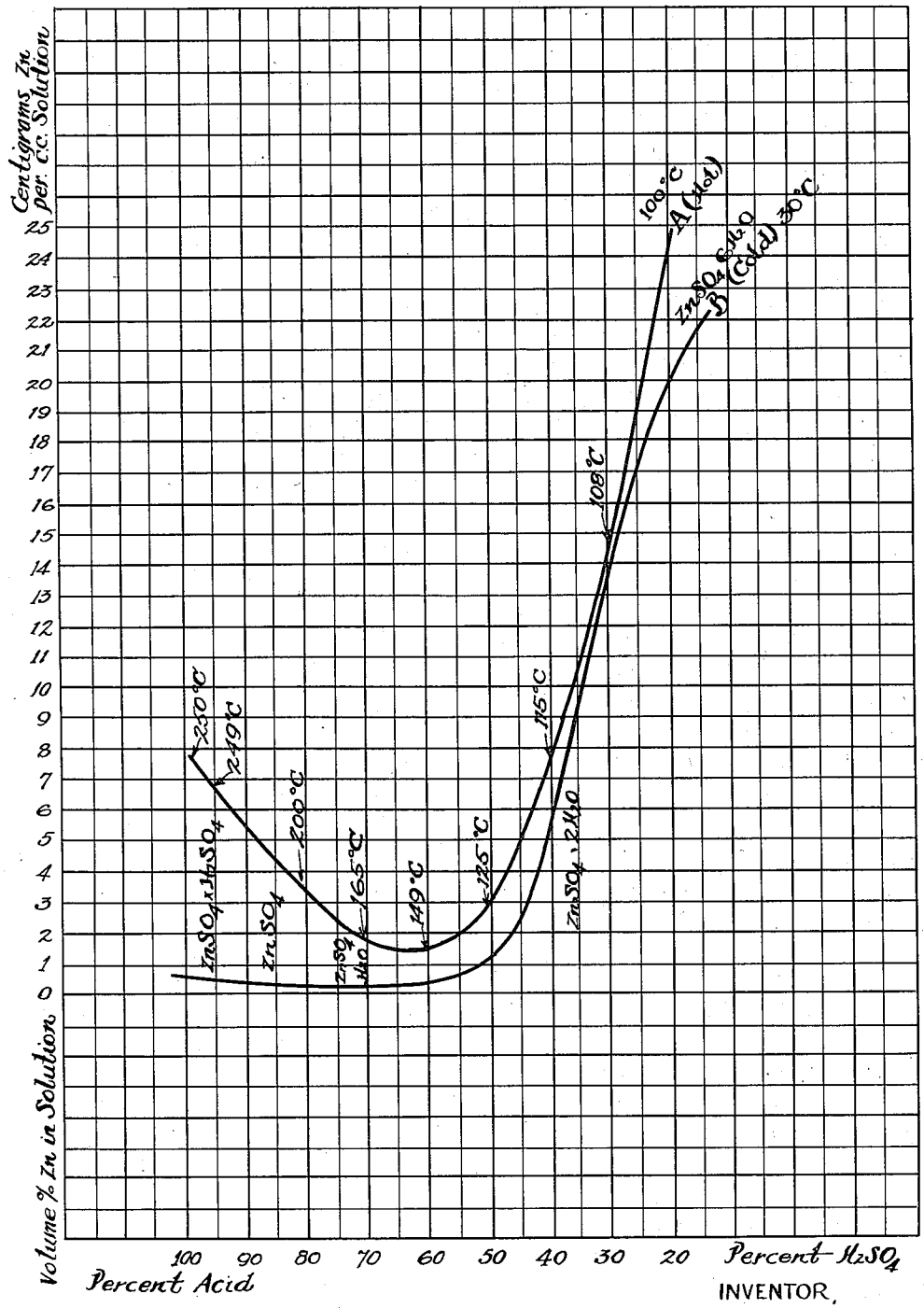

The wide application and the great usefulness of the invention in connection with the processes mentioned above are made possible by the following facts relating to the solubility of the sulphates of metals mentioned: The solubility of these metal sulphates in cold solutions of sulphuric acid of varying concentrations decreases rapidly with increase in acid concentration until a point of minimum solubility is reached near or slightly above 60% $H_2SO_4$. In the cold solutions above this concentration, the solubility of the zinc, iron and copper sulphates is nearly constant, increasing slightly as the acid concentration increases from 85% to 95%. Aluminum sulphate differs from the other sulphates in that instead of a rapid decrease from the maximum solubility in water, such as is the case with $ZnSO_4$, $FeSO_4$, and $CuSO_4$, the solubility of the $Al_2(SO_4)_3$ is increased by addition of $H_2SO_4$ until the acid reaches 5% beyond which the solubility drops rapidly with increasing acid concentration until the acid concentration reaches 40% and then more slowly until the point of minimum solubility is near 60% $H_2SO_4$. Above this concentration the solubility increases, first slowly up to 70% and then more rapidly with increasing acid concentration from 70% to 90% $H_2SO_4$, due to the formation of hydrated acid salts. In hot $H_2SO_4$ solutions, i. e., substantially at the boiling point of the solutions, the solubilities of these metal sulphates are similar to the solubilities of the metal sulphates in the cold acid solutions, the solubility decreasing very rapidly with increase in acid concentration and reaching the point of minimum solubility at an acid concentration of approximately 60% or between 60% and 65% $H_2SO_4$, the solubility in hot acids above this concentration increasing slowly at first up to 70% or 75% $H_2SO_4$ and then more rapidly from this point to 95% $H_2SO_4$. The general form of the solubility curves is shown in Figure 2, which shows the solubility of $ZnSO_4$ in hot (at the boiling point) and in cold sulphuric acids of different concentrations. The coordinates of the curves are centigrams Zn carried per cc. of solution as $ZnSO_4$ and per cent of free $H_2SO_4$ in solution. Curve A shows the variation in solubility in the hot acids and curve B in the cold acids. The forms of the curves for $Al_2(SO_4)_3$ differ from these curves in that both of the left hand limbs of the curves, which show the solubility of the aluminum sulphate in the acids of higher concentration, curve sharply upward to the left from the point of minimum solubility. The points of minimum solubility for the different sulphates are approximately as follows: In the cold acids at 25° C. $ZnSO_4$, .65% at 60% $H_2SO_4$; $FeSO_4$, .14% at 63% $H_2SO_4$; $Al_2(SO_4)_3$, 1.1% at 57½% $H_2SO_4$; $CuSO_4$, .18% at 65% $H_2SO_4$. In the hot acids the minimum solubility of all the sulphates is considerably higher than in the cold acids; for example, the minimum point in the hot acid for $ZnSO_4$ is approximately 3.25% at 62½% $H_2SO_4$ and for $FeSO_4$, approximately .95% at 65% $H_2SO_4$.

Figure 3:
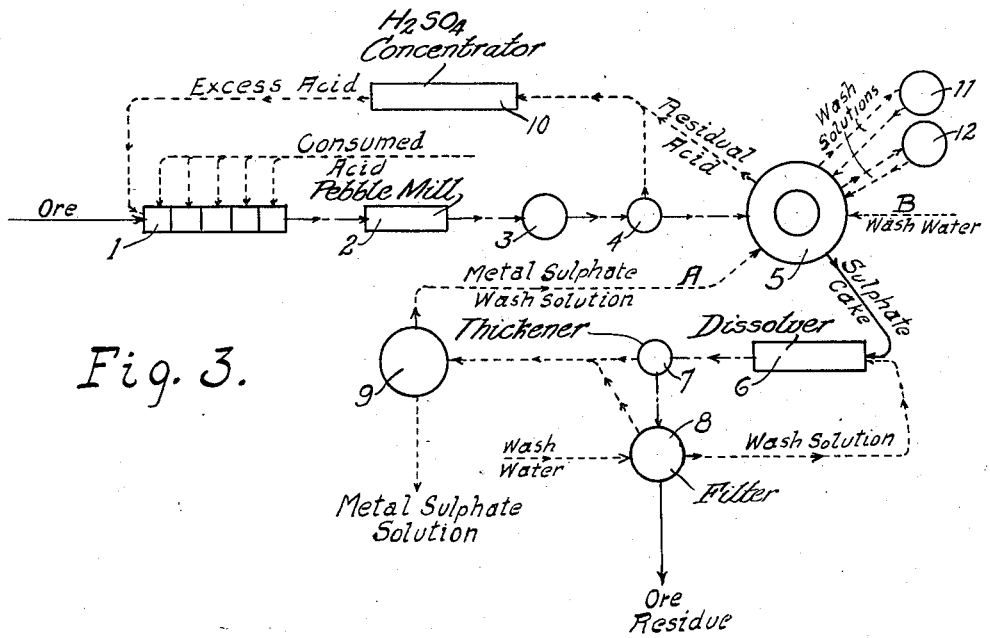
Figure 4:
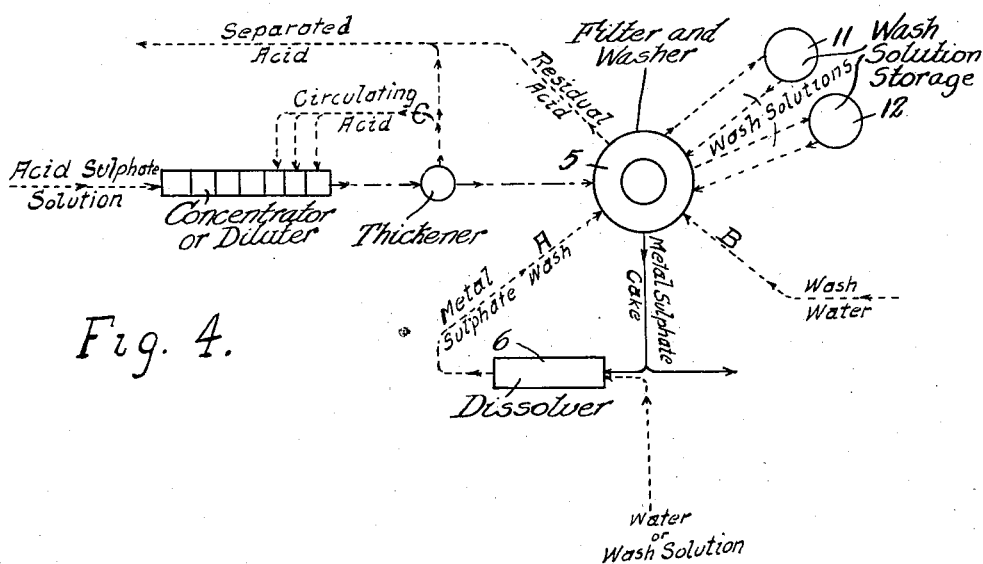
Figure 5:
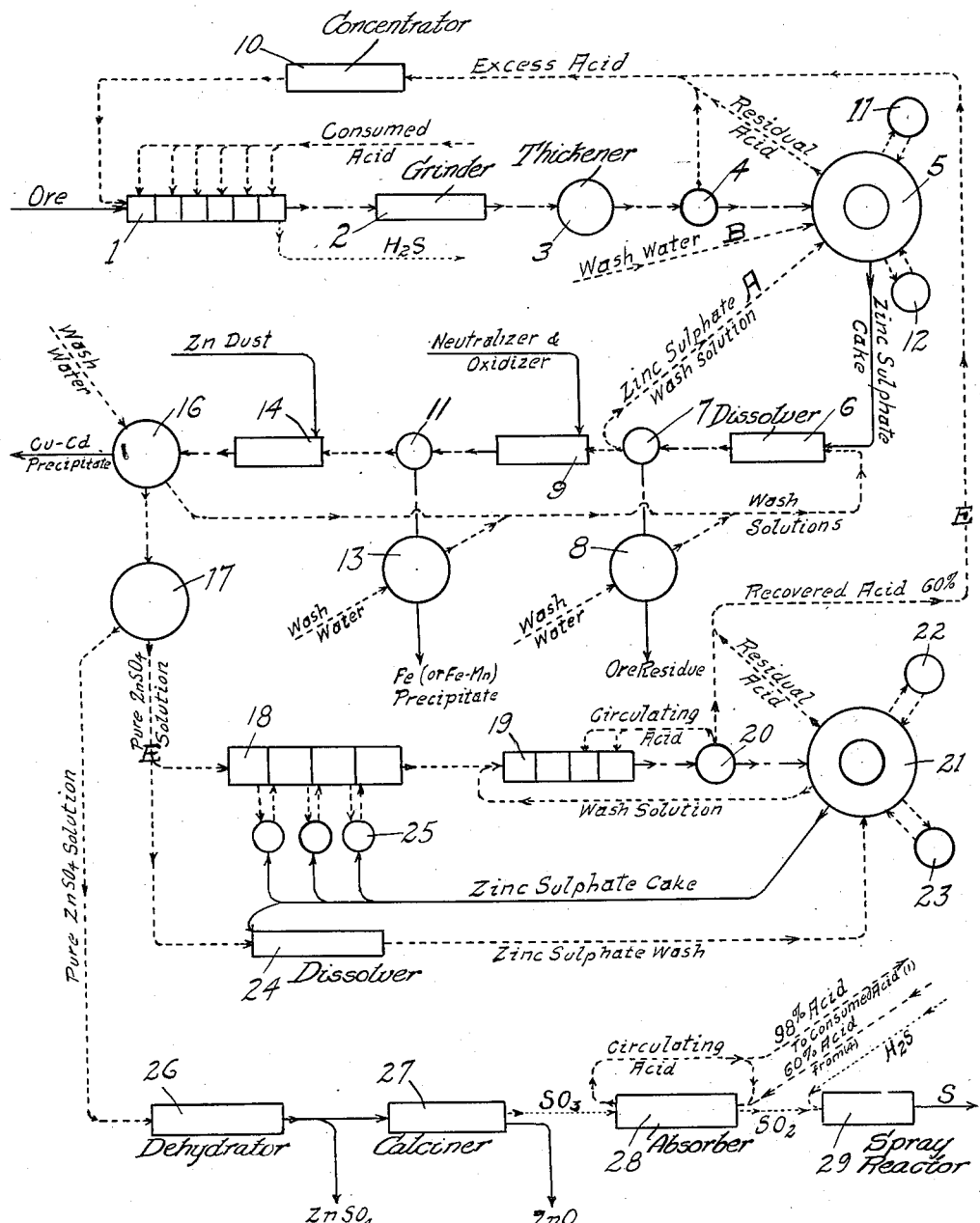
Figure 6:
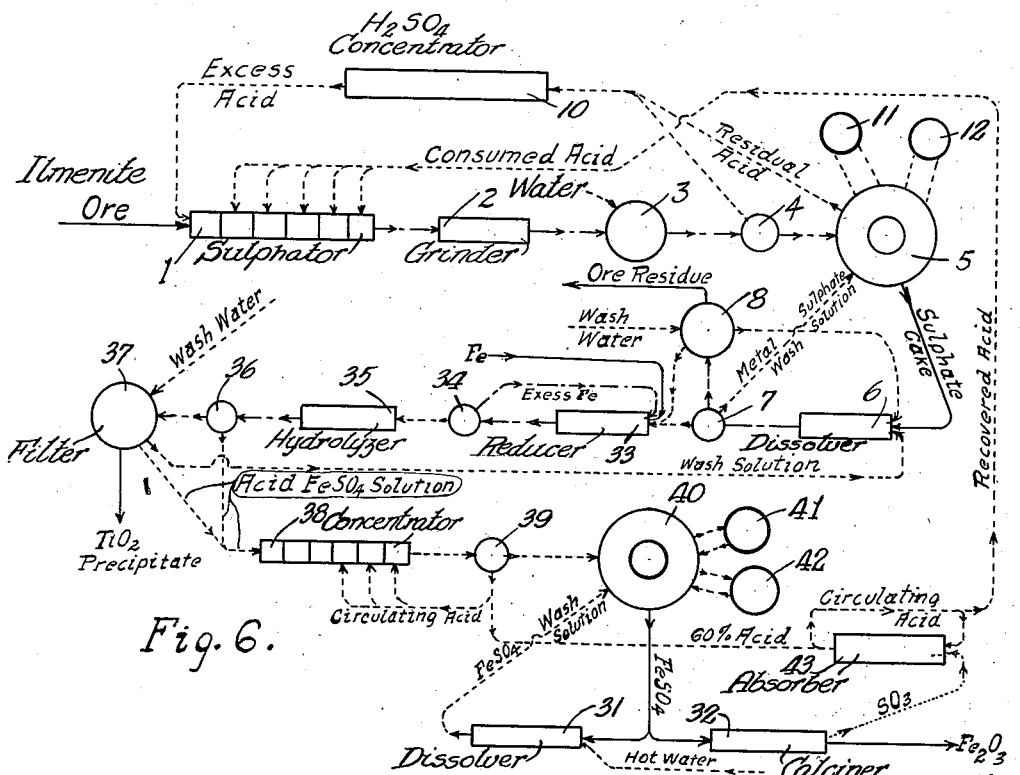
Figure 7:
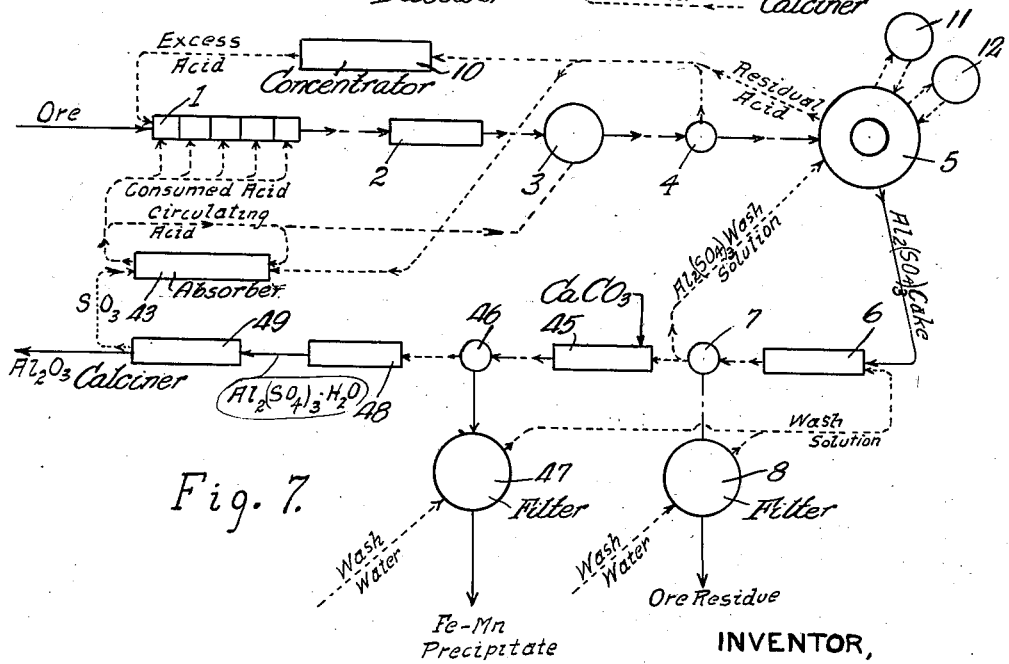

By the proper utilization of these facts in connection with the first mentioned discoveries as to the separation of sulphuric acid from the metal sulphates, processes of great value and of wide application in the treatment of ores of zinc, iron and aluminum and in the treatment of sulphuric acid solutions of the metal sulphates are obtained. Two general methods of applying the invention to practical use are illustrated in Figures 3 and 4. Figure 3 is a flow sheet showing the method of applying the invention to the direct treatment of ores and other similar products, in which the $H_2SO_4$ is used to convert the metals to the solid sulphates, for separation of the excess acid from the solid sulphate and the ore residue. Figure 4 is a flow sheet showing the method of applying the invention to the treatment of sulphuric acid solutions of the metal sulphates, for the separation and recovery of the metal sulphates therefrom. Specific applications of the invention to the treatment of ores of zinc, iron and titanium, and aluminum are illustrated in Figures 5, 6, and 7. Figure 5 is a partial flow sheet illustrating the application of the process to electrolytic processes of recovery of zinc from sulphate solutions and particularly illustrating the use of the invention in connection with both the treatment of the ores with sulphuric acid and the recovery of the zinc by electrolysis. Figure 6 illustrates the application of the invention to the treatment of iron-titanium (ilmenite) ores with sulphuric acid and particularly its application in connection with the separation and recovery of the acid and ferrous sulphate from the solutions made in this process. Figure 7 illustrates the application of the invention in connection with the treatment of aluminum ores such as clay, bauxite, $Al_2O_3$ from alunite, etc., for the recovery of the aluminum therefrom as aluminum sulphate or alumina. In these flow sheets, full lines indicate solids, dotted lines indicate solutions, dot and dash lines indicate fluid mixtures of liquids with finely divided solids, and fine dotted lines indicate gases. The arrows on these lines indicate the direction of flow.

Figs. 1 and 2 are curves illustrating the invention. Figs. 3 to 7, inclusive, are flow sheets illustrative of the processes involved.

The general method of applying the invention to the treatment of ores as illustrated in the flow sheet of Figure 3 is as follows: The ore preferably ground (and, if required, otherwise treated to make it amenable to treatment with $H_2SO_4$) is mixed with an excess of hot $H_2SO_4$ of the required concentration and the mixture agitated for a sufficient time to convert the metal of the ore to the sulphate. This sulphating operation is preferably carried out in two steps; the first a concurrent agitation in a suitable agitator or series of agitators (1) so arranged that during the flow of the mixture of acid and ore through the agitator, acid of the required strength may be added at intervals so as to maintain the acid strength at any desired concentration during this treatment. The acid mixed with the ore in the beginning of this operation is the excess or circulating acid used in the process and the acid added during the agitation is the amount of acid consumed in converting the metals in the ore to the metal sulphate. This preliminary treatment converts a large part of the metal to the sulphate but to avoid an excessively long period of treatment and also to secure a practically complete conversion of the metal of the ore to the sulphate the final step of the sulphating operation is preferably carried out by grinding the hot mixture in a suitable pebble mill (2) made acid proof and lined with silex or porcelain and supplied with flint or porcelain (or other acid proof material) pebbles. The amount of excess acid used in this sulphating operation should preferably be kept as small as is consistent with maintenance of the desired or required acid concentration and of such a proportion as to secure a pulp which will flow through the apparatus used, this minimum being desired in order to secure as high a capacity for the apparatus as possible and also to handle as small a volume of excess acid as possible. The mixture of excess acid, metal sulphate and ore residue from the sulphating operation is passed into a regulating tank (3) in which the concentration of the acid in the pulp may be brought to the desired point in the range of minimum solubility of metal sulphate (by dilution with water or weak acid if the concentration is higher than desired, or by the addition of more concentrated acid if the concentration is lower than desired) so as to secure the maximum amount of metal sulphate in solid form in the mixture. In case the acid at the end of the sulphating operation is at the desired concentration this tank (3) is merely a means of regulating the flow to the following treatment, though in most cases a small amount of additional sulphating is secured due to the added time of treatment. As much as possible of the excess hot acid is separated from the mixture of metal sulphate and ore residue preferably in a suitable thickening device (4) (preferably a continuous pressure thickener of the type described in my copending patent application Serial No. 659,425), the excess acid being returned to the sulphating operation as shown. The thickened pulp from the thickener (4) is now treated for the separation of the remaining excess acid from the solid metal sulphate as described above. This operation may be carried out in any suitable device (5) such as a filter (or centrifugal separator) in which a cake is first formed (by the removal of as much of the residual acid as possible) through which the wash solution may be passed for the selective removal of the free acid from the solid metal sulphate as described above. Two preferred types of apparatus may be used, either a horizontal annular filter or a suitable centrifugal filter. The filter consists of an annular trough with a suitable horizontal annular filter medium of acid proof porous material such as alundum (fused aluminum oxide) or filtros (porous silica plate) with a closed annular suction space beneath the filter medium with suitable means for applying a vacuum thereto and for removing the solutions therefrom and means for slowly rotating the filter in horizontal annular path around its central axis. The thickened pulp is fed continuously onto the moving filter from a stationary radial feed hopper in a layer of the desired thickness, and, after washing, the cake is removed by a suitable stationary radial plow or scraper and a radial discharge screw. During the passage of the filter cake around the path from the feed hopper to the discharge scraper and screw, the selective washing operation is carried out as follows: The fluid or semi-fluid layer of pulp fed onto the filter contains excess acid which is first removed by filtration (by application of the vacuum in this apparatus). During this operation the pulp should be "puddled" or agitated or worked by means of stationary radial paddles in contact with the surface of the cake. This agitation and working of the cake during the filtration makes it possible to remove from 30% to 50% of the acid which would be left in the cake without this manipulation, and also makes a more uniform and compact filter cake which is more suitable for the selective washing operation. The cake which is formed merely by application of the vacuum appears to be fairly firm when as much as possible of the acid has been filtered away, but if this cake is agitated and worked or "puddled", it immediately becomes fluid and allows the removal of from 30% to 50% more acid forming a firm cake much more suitable for washing than the first cake. After the removal of the excess acid, the selective washing operation is carried out by supplying the water, or metal sulphate solution, to the surface of the cake as rapidly as it is withdrawn into and through the cake. The water or solution is supplied until the desired amount of washing is secured. As shown in Figure 1, nearly complete removal of the free acid may be secured by washing with water alone without dissolving any large proportion of the solid metal sulphate. By using a concentrated solution of the metal sulphate, the efficiency of the washing may be considerably increased and substantially all of the free acid may be removed without dissolving any appreciable amount of the metal sulphate in the cake. The point to which the washing is carried and whether or not the metal sulphate solution is used in the washing operation will depend upon the object of the process and the method of treatment following the washing operation as more fully discussed in the specific cases described below. Whether water alone or the metal sulphate solution is used for washing, the efficiency of separation may be increased by separating successive portions of the wash and using these over again in the washing operation substantially as follows: In any case the residual acid removed by direct filtration and the first part of the acid removed by displacement by the wash is mixed with the excess acid from the thickener (4) and sent back to the sulphating operation, through the heater or concentrator and heater (10). The first portion of the wash of sufficiently high acid concentration is also sent in the same way. Succeeding washes of successively lower acid concentrations are sent to wash storage tanks (11) and (12) (or a series 11, 12, 13, etc., if desired) and are used for successive portions of the succeeding washes in the order of their acid concentration from high to low, the final or end portion of the wash being done with the water alone or the neutral metal sulphate solution. By using this method of washing, the amount of wash water or wash solution required to remove any given part of the residual free acid may be considerably reduced as compared with the use of water or metal sulphate solution alone. This method is especially applicable in cases in which the substantially complete removal of the free acid from the metal sulphate is desired. It should also be noted that this method not only reduces the amount of wash solution required for the removal of any given part of the residual free acid but also reduces to the minimum the amount of metal sulphate carried back into the sulphating operation with the circulating acid as a circulating load of metal sulphate. A considerable difference in the efficiency of the washing operation, i. e., differences in the ratio of acid and metal sulphate removed by a given amount of wash, and differences in the amount of wash required to wash the free acid out of the cake down to a given point, occurs with variation in the way in which this operation is carried out. For example, if "puddling" or agitation and working of the cake is not used, considerably more acid must be removed in the washing operation than if puddling is used. The removal of this relatively large amount of excess acid by washing with water results in the lateral shrinkage of the cake causing a characteristic "pitting" of the cake, i. e., the formation of numerous small holes or pits over the entire surface of the cake, which reduces the efficiency of the wash in a manner similar (but not nearly so severe) to channeling or cracking. By "puddling" or working the cake during the direct removal of the acid, the proportion of acid in the cake is reduced from 30% to 50%, a more regular cake is secured, and the amount of "pitting" is greatly reduced, so that a much more efficient wash may be secured. If a metal sulphate solution is used in the washing operation, the "pitting" is reduced to the minimum due to deposition of metal sulphate from the wash solution in the interstices of the cake. The greatest efficiency of the washing operation is therefore secured by "puddling" followed by washing with the metal sulphate solution. It will be apparent that a great variation in the washing operation may be secured, extending from washing with water without previous "puddling" to washing with hot concentrated metal sulphate solution after "puddling". The washing operation may thus be made to conform with a wide range of requirements as to the ratio of acid to metal sulphate in the washed cake according to the requirements of the process used in treating the sulphated material.

As previously noted, this selective washing operation may also be carried out in a centrifugal filter of proper design, made proof against the acid solutions and using a suitable filter medium such as curved plates of alundum or filtros. In using the centrifugal filtration, the "puddling" operation is not as essential as in the case of the vacuum filtration described above, as a more efficient removal of the residual acid by direct filtration can be secured in the centrifugal filter than upon the vacuum filter (due to the high centrifugal force which may be used). The washing operation in the centrifugal filter is carried out in substantially the same manner as that described for the annular vacuum filter, the successive washes being kept separate and used for washing as described if an especially high efficiency is desired. In many cases this will not be necessary as the efficiency of a direct wash without reuse of the wash solutions is so high, as shown in the curve of Figure 1. The washing of the cake in the centrifugal with water must not be too prolonged or the "setting" of the cake due to hydration of the metal sulphate may make the removal of the washed cake difficult or practically impossible. Though the two types of apparatus described above are preferred types, any suitable apparatus in which the wash may be supplied and controlled as described may be used.

The washed metal sulphate cake from the filter and washer (5) is mixed with water, or preferably wash solutions from succeeding filtering operations in succeeding parts of the process and agitated to dissolve the metal sulphate, and any residual acid left in the washed cake, in the dissolver (6). If desired, suitable oxidized ore or other material may be added during this operation to neutralize any residual acid left in the cake, the agitator in that case being used as both dissolver and neutralizer (6). The metal sulphate solution thus made is separated from the ore residue in a suitable filter or preferably in a thickener (7) of the type previously described, the thickened pulp being filtered and washed upon a final filter (8), the washed ore residue being discharged to waste (or to another process for further treatment for the recovery of other metals) and the wash solution being sent to the dissolver (6) as described. The concentrated metal sulphate solution from the thickener (7) and filter (8) is sent to the storage tank (9) as supply for subsequent treatment and recovery of the metal or sulphate therefrom. If metal sulphate solution is used in the washing operation, which is preferable in most cases, part of this solution from storage tank (9) is returned to the circuit for use as the wash solution in the washing operation upon the filter in the washer (5) (as indicated by the flow line A) as previously described. If desired, water alone may be used in the washing operation as indicated by the flow line (B). By the use of washes from succeeding filtering and washing operations in the remainder of the process and by the use of metal sulphate solution in the differential washing operation, the amount of water used in the process may be reduced to a minimum, avoiding all accumulation of wash and waste solutions (a matter of very considerable importance in hydro-metallurgical processes).

The general method of application of the invention to the treatment of metal sulphate solutions containing sulphuric acid for the separation and recovery of the acid and the metal sulphate therefrom as illustrated in Figure 4 is as follows: The dilute acid metal sulphate solution is concentrated until the concentration of the $H_2SO_4$ in the solution reaches the range or point of minimum solubility of the metal sulphate in the acid solution. During this concentration there is a continuous precipitation of the metal sulphate from the point at which the saturation point for metal sulphate is reached until the point of substantially minimum solubility is reached at which time substantially the maximum possible precipitation of the metal sulphate has occurred. The amount of precipitate and volume of residual acid solution will, of course, depend upon the concentration and ratio of acid to metal sulphate in the original solution. Due to the precipitation of the metal sulphate during the concentration, this operation must be carried out in a concentrator capable of handling the mixture of acid and precipitated sulphate formed during the concentration. The preferred type of concentrator consists of an acid proof spray drum in a suitable housing arranged to spray the acid or mixture of acid and solid sulphate into contact with hot gases, of the type described in my U. S. Patent Number 1,462,363, and combined with a suitable agitator to keep the solid metal sulphate in suspension, of the type described in my U. S. Patent Number 1,803,792. The concentration should preferably be carried out in several stages with counter-current flow of solution and gases, the hot gases coming into contact first with the most concentrated acid and last with the incoming solution, so as to secure the maximum efficiency of evaporation with the minimum heat and minimum volume of gases. If the proportion of solid sulphate precipitated during this treatment is so large that the mixture of acid and pulp becomes too thick to be efficiently sprayed and otherwise handled, previously concentrated and separated $H_2SO_4$, is introduced into the said concentrator at suitable points in sufficient quantity to maintain a pulp of proper consistency for efficient operation, as indicated in Figure 4 by the flow line (C). The excess $H_2SO_4$ in the mixture of concentrated acid and precipitated metal sulphate, from the concentrator, is then separated in the thickener as previously described, and the thickened mixture of acid and solid metal sulphate is filtered and washed upon the filter and washer or centrifugal as previously described. The separated acid from the thickener and residual acid washed out of the cake in the filter and washer (5) may be returned to previous steps in the process for reuse. Part of the separated acid from the thickener may be continuously returned to different stages of the concentration in the concentrator to carry the precipitated metal sulphate through the concentrating step, this acid being merely a circulating load in this step. The washing operation on the filter and washer may be carried out by any of the methods previously described, using either metal sulphate solution or water as the washing medium, and also dividing the washes into separate successive portions and storing them in the storage tanks, for reuse in washing if desired. In most of the processes illustrated in Figure 4, a high efficiency and substantially complete separation of the acid will be desired and metal sulphate solution will therefore in most cases be used for the washing medium (as indicated by the flow line A) and the later part of the washes will be separated into successive portions for reuse as described (though in some cases water alone may be used for washing as indicated by flow line B). The efficiency of washing in this case will be higher than in the washing operation of Figure 3, as the filter cake contains no ore residue and the ratio of acid to metal sulphate is lower. The washed solid metal sulphate cake from the filter and washer (5) is discharged into succeeding operations of the process. If the selective washing operation is carried out with metal sulphate solution, a portion of the washed sulphate cake is dissolved in water, or preferably in wash solution from succeeding steps of the process, in the dissolver (6) to form the (preferably concentrated) metal sulphate wash solution, which is returned to the filter and washer (5) as indicated by the flow line (A).

In the treatment illustrated by the flow sheet of Figure 4, if the acid in the mixed sulphate solution being treated is above the concentration at which the solubility of the metal sulphate is at the minimum, the solution will be diluted with sufficient water (or wash solution from other steps in the process) to bring the acid concentration down to the proper point so as to precipitate the metal sulphate therefrom. In this case a diluter is substituted for the concentrator. Such dilution instead of concentration may occur in the treatment of titanium ores. The treatment of the mixture of diluted acid and solid metal sulphate (made by dilution as described) for their separation is then carried out as described above.

The specific application of the invention as described above, to the treatment of zinc sulphide ores for the recovery of the zinc therefrom as zinc sulphate, zinc oxide or as metallic zinc is illustrated in the flow sheet of Figure 5. That part of the flow sheet beyond the storage tank (17) also illustrates the specific application of the invention to the process of recovering zinc from sulphate solutions by electrolysis, and the specific application of the invention to the treatment of roasted zinc sulphide ores and oxidized ores of zinc by the electrolytic process.

In the application of the invention in the treatment of zinc sulphide ores, the finely ground ore is agitated with as small an excess of hot $H_2SO_4$ (kept near the boiling point), of a concentration preferably near 60%–62% $H_2SO_4$, in a series of agitators, or a concurrent agitator (1), so arranged that the amount of acid consumed in sulphating the ore may be added as stronger acid (preferably 95% to 98%) in successive stages of the agitation and sulphating so as to keep the acid concentration as near 60% as possible. The acid is preferably kept near this concentration in order to keep the formation of sulphur by reaction between the $H_2S$ and $H_2SO_4$ at a minimum, as this reaction becomes rapidly more active with increase in acid concentration above 60%; also, since the solubility of the $ZnSO_4$ in the acid is a minimum at approximately 62%, no further adjustment of the acid concentration is required for the separation of the acid and solid zinc sulphate formed. The partially sulphated ore from the preliminary sulphator (1) is then passed through the grinding sulphator (2) to complete the sulphation of the zinc. In the treatment of the zinc sulphide ores, the use of the preliminary sulphator (1) ahead of the grinding sulphator (2) is desirable and practically necessary because of the large amount of froth formed during the sulphating operation due to the large volume of $H_2S$ evolved. A large percentage of the sulphating and release of $H_2S$ may be secured in the preliminary sulphator, thus reducing the amount of froth released in the grinding sulphator and greatly increasing its capacity. Without the preliminary sulphator, the grinding sulphator (2) would be filled with a light froth and would therefore have a very low capacity for any given time of treatment required by the ore. A treatment of one hour in this sulphating operation converts substantially all of the zinc sulphide to zinc sulphate in solid form. The mixture of excess hot acid, solid zinc sulphate and ore residue passes through the regulating or surge tank (3), in which a small amount of additional sulphating occurs, to the thickener (4) in which the excess of hot acid is removed and the thickened pulp is sent to the filtering and washing operation on the filter and washer (5). In this operation, the excess acid is further reduced by "puddling" and filtration as described above and the residual acid is washed out as previously described and mixed with the excess acid from the thickener and filter, and passed through the concentrator and heater (19) for concentration to 60%–62% and returned to the sulphator (1) for the treatment of more ore. The washing operation upon the filter and washer (5) may be carried out as previously described with either zinc sulphate solution from succeeding steps of the process, or with wash water as indicated respectively by the flow lines A or B. If no oxidized zinc ore is available for neutralizing, substantially all the free acid is washed out of the zinc sulphate cake by washing with neutral zinc sulphate solution as indicated by line A. If oxidized ores or roasted zinc sulphide ore are available the washing may be done with water, as indicated by the flow line B, the acid being washed down to the amount required to dissolve the zinc in the oxidized ore to be treated. Successive later washes in this operation may be sent to the wash storage tanks (11 and 12) for reuse in washing as previously described and as indicated in the flow sheet, in order to increase the efficiency of the washing operation and reduce the amount of water introduced into the circuit. The washed sulphate cake from the washing filter (5) is mixed with wash solution from succeeding filtering operations and agitated in the dissolver (6) to dissolve all the zinc sulphate (and other soluble sulphates). The mixture of residual ore and impure zinc sulphate solution thus formed is separated in the thickener (7), the impure zinc sulphate solution going to the neutralizer (9) and the thickened pulp being filtered and washed upon the filter (8), and the ore residue discharged to waste or further treatment. The richer zinc sulphate solution from the filter (8) is mixed with the impure zinc sulphate solution entering the neutralizer (9), and the poorer wash solutions are sent to the dissolver (6) to dissolve the zinc sulphate in the incoming sulphate cake as described. In the neutralizer and precipitator (9) the free acid is neutralized with oxidized zinc ore or calcines, or other suitable material, and the iron (or iron and manganese) is oxidized by means of a suitable oxidizing agent, such as lead peroxide, and precipitated by means of the oxidized ore or other suitable precipitant. The precipitate, or mixture of precipitate and ore residue, is separated from the zinc sulphate solution in thickener 11 (preferably of the type previously described), the solution being sent to the Cu—Cd precipitator (14) and the precipitate, or mixture of precipitate and oxidized ore residue, is filtered and washed on the filter (13), the richer zinc sulphate solution wash being sent to the precipitator (14) (for removal of Cu and Cd, by adding zinc dust) and the poorer wash solution being sent to the dissolver (6) for use in dissolving the solid zinc sulphate as described above. The Cu and Cd in the iron free zinc solution is precipitated with metallic zinc dust in the Cu—Cd precipitator (14) and the precipitate separated from the solution and washed in the filter (16), (the weak wash solution from this also being sent to the dissolver (6) as previously described). The zinc sulphate wash solution, for use in the washer (5) may be secured at any suitable point in the circuit beyond the dissolver (6), illustratively a part of the solution from 7.

The pure zinc sulphate solution from the filter (16) is run into tank 17 and can be treated for the recovery of the zinc therefrom as solid sulphate, oxide or as metallic zinc. The specific application of the invention to the recovery of the zinc by electrolysis is shown in that portion of the flow sheet of Figure 5 from E to E. The concentrated pure zinc sulphate solution, from the storage tank (17), is passed through successive cells of the electrolytic circuit (18), the zinc being precipitated as metallic zinc and the sulphate ion freed as sulphuric acid. At different successive stages of the electrolysis, as the electrolyte becomes depleted in zinc the solution is diverted into the agitators (25) and brought into contact with solid zinc sulphate so as to maintain the zinc concentration at the maximum throughout the electrolysis, making possible the use of a high current density throughout the electrolysis and the use of a high acid concentration in the later stages of electrolysis (see my copending Patents Nos. 1,937,633 and 1,937,634).

The electrolysis of the zinc sulphate solution during the passage of the solution through the electrolytic circuit proceeds until the acid concentration reaches the maximum desired, after which the acid electrolyte is withdrawn from the electrolytic circuit (18) and passed through the concentrator (19), preferably of the type previously described. In its passage through the successive stages of the concentrator (19) the acid is gradually concentrated until upon leaving the concentrator its concentration is approximately 60%. During the concentration the residual zinc sulphate in the solution is precipitated. If the amount of zinc sulphate thus precipitated is sufficient to prevent proper operation of the concentrating device, previously separated acid from the thickener (20) or filter and washer (21) is added in sufficient quantity to maintain a pulp of proper fluidity in the concentrator as indicated upon the flow sheet, and as previously described. The mixture of 60% $H_2SO_4$ and solid zinc sulphate from the concentrator (19) is partially separated in the thickener (20), the 60% acid being returned to the sulphating circuit for the treatment of more sulphide ore as shown, and the thickened mixture of solid zinc sulphate and residual acid is filtered and washed preferably with concentrated neutral zinc sulphate solution from the storage tank (17) or with $ZnSO_4$ solution made by dissolving some of the solid zinc sulphate from the washer (21), if desired, upon the filter and washer (21) to remove the residual acid therefrom. The washed (pure) zinc sulphate crystals from the washer (21) are then returned to the electrolytic circuit, being dissolved in electrolyte withdrawn from the electrolytic circuit in the agitators (25) and returned to the circuit in this solution as described above. Some of these zinc sulphate crystals go into tank 24 to saturate the $ZnSO_4$ solution passing through this tank to 21.

The application of the invention in the recovery of zinc from roasted zinc sulphide ores and concentrates and from oxidized ores differs from its application to sulphide ores only in that the concentrated acid (60%) from the thickener (20) and residual acid from the filter and washer (21) is used to treat the roasted sulphides, or the oxidized ore, either by the method described in the foregoing or by diluting the acid and leaching the ore by the method now in common use in electrolytic plants. In the first case the invention would be applied both in the separation of the acid from the solid sulphate in the treatment of the ore and in the separation of the acid and zinc sulphate from the acid electrolyte as described above. In the second case the invention would be applied only in the separation of the acid and zinc sulphate from the acid electrolyte as described. In the treatment of the zinc sulphide ores, as described, to convert the sulphide to sulphate the 60%–62% acid preferably used must be kept near the boiling point in order to secure a rapid and substantially complete conversion of ZnS to $ZnSO_4$, whereas in treating the oxidized ores in the same manner the acid may be used at ordinary temperatures with excellent conversion. If desired, the zinc sulphate solution from the storage tank (17) may be evaporated in the dehydrator (26) to recover the $ZnSO_4$ in the form of a dry powder (which may be marketed), which may be calcined in the calciner (27) to form ZnO and $SO_3$, the $SO_3$ being absorbed in acid in the absorber (28) and returned to the sulphating circuit for the treatment of more ore. The $SO_2$ formed in this operation may be mixed with $H_2S$ from the sulphating operation in the spray reactor (29) to recover the sulphur from these gases as elemental sulphur.

In Figure 6, the application of the invention to the sulphuric acid treatment of iron-titanium (ilmenite) ores for the recovery of the titanium oxide, and for the separation of the $H_2SO_4$ and ferrous sulphate and recovery and reuse of the acid in the process is illustrated. In this process the finely ground ilmenite ore is mixed with an excess of the concentrated acid and agitated in the agitator (1) to secure as complete decomposition of the ore and conversion of the iron to ferrous sulphate as is possible. To secure the highest efficiency in this process, the excess circulating acid may be maintained at the concentration most desirable for chemical results and operating conditions by adding the amount of acid consumed as concentrated acid (95% to 100% $H_2SO_4$) at successive stages of the operation as desired. To avoid any return of undecomposed ore residue, the sulphation is preferably completed by grinding the mixture from the preliminary sulphator (1) in the pebble mill (2) substantially as previously described. The mixture of sulphated ore, excess acid and ore residue from the sulphating operation is mixed with sufficient water in the regulating tank (3) to bring the acid concentration to 60% to 62% $H_2SO_4$. This dilution is required on account of the fact that rapid decomposition of the ilmenite requires acid concentrations considerably above 60%, and that the washing operation for separation of the free acid from the ferrous sulphate is much more efficiently carried out at this concentration than at higher acid concentrations, and also in order to reduce the circulating load of titanium sulphate, carried in the circulating acid, to the minimum. The mixture of sulphated ore, excess acid and ore residue, is separated in the thickener (4), as previously described, the excess acid returning to the concentrator (10) for concentration to the desired point for reuse in the sulphating operation, and the thickened pulp being washed on the filter and washer (5) to separate the residual free acid from the mixture of solid ferrous sulphate, titanium sulphate, and ore residue. In this washing operation, neutral ferrous sulphate solution from the thickener (7) or dissolver (12) is used as the wash solution, which is carried out as previously described, successive later portions of the wash being preferably separated and sent to the wash storage tanks (11) and (12) for reuse in earlier stages of succeeding washing operations in order to increase the efficiency of the washing operation and reduce the amount of wash required, as previously described. The residual acid washed out of the cake upon the filter (5) is mixed with the return circulating acid from the thickener (4) and concentrated for reuse in the sulphating operation as described. The washed cake from the filter (5) containing the ferrous sulphate, titanium sulphate and ore residue, is mixed with water or preferably wash solutions from the succeeding washing operations, in dissolver 6, as indicated upon the flow sheet, to dissolve the ferrous sulphate and titanium sulphate. The solution thus formed is separated from the ore residue in the thickener (7), the thickened pulp being filtered and washed on the filter (8). The clear solution from the thickener (7) and filter (8) is sent to the reducer (33) and the more dilute wash solution from the filter (8) is sent to the dissolver (6) as previously described. In the reducer (33) the solution is agitated with finely divided metallic iron to reduce any ferric iron to the ferrous condition. The excess iron is separated from the reduced solution in the thickener or filter (34) (preferably of the filter tube type previously described) and the excess iron returned to the reducing operation as indicated on the flow sheet. The reduced solution is boiled in the hydrolyzer (35) to precipitate the titanium as the hydrated oxide and form $H_2SO_4$ in solution. During this treatment inert diluents, such as barium sulphate or neutralizers forming diluents (such as $Ca(OH)_2$ to form $CaSO_4$) may be added as in the processes now in commercial use, or the hydrated titanium oxide may be precipitated alone, as desired. This titanium precipitate, or mixture of precipitate and diluent, is separated from the acid ferrous sulphate solution in the thickener (36) and is filtered and washed on the filter (37) and calcined and ground to form a paint pigment. The dilute wash solution from this operation is sent to the dissolver (6). The acid ferrous sulphate solution, from the thickener (36) and filter (37), is sent to the concentrator (38) in which the acid is concentrated to approximately 60% and the ferrous sulphate is precipitated. During the final stages of this operation, separated 60% acid from the thickener (39) or filter (40) may be returned to the concentrator to secure a fluid pulp which may be efficiently handled by the apparatus. The mixture of ferrous sulphate crystals and 60% sulphuric acid from the concentrator (38) is separated in the thickener (39), the separated acid being returned to the process as described below, and the thickened pulp being filtered and the residual acid being washed away from the ferrous sulphate crystals with hot concentrated ferrous sulphate solution from the dissolver (31) on the filter and washer (40), the latter part of the wash being separated and sent to the storage tanks (41) and (42) for use in earlier stages of succeeding washing operations, as previously described. Part of the ferrous sulphate cake from the washer (40) is dissolved in hot water in the dissolver (31) to make the ferrous sulphate wash solution used in the washing operation upon the washer (40). The remainder of the ferrous sulphate cake is (preferably dried first) sent to the calciner (32) and heated with sufficient air or oxygen to decompose the salt and form $SO_3$ and $Fe_2O_3$. The $SO_3$ from this operation is absorbed in the acid solution from the thickener (39) or preferably in concentrated acid from the concentrator (19) in the absorber (43) and used over again in the sulphating operation as previously described. It will be noted that the invention in this case as in the previously described sulphating and electrolytic treatment of zinc ores is used not only in the primary sulphating treatment of the ore but also in the treatment of the sulphate solution for the recovery of the acid and metals therefrom.

The utilization of the invention in the treatment of aluminum ores, such as clay or bauxite, for the recovery of the aluminum therefrom as sulphate or as oxide is illustrated in the flow sheet of Figure 7. The finely ground ore (previously dried, and if clay or alunite, previously calcined) is mixed with hot circulating acid and agitated in the preliminary sulphator (1), concentrated acid being added at different stages of the operation to keep the acid at the most suitable concentration. To secure rapid complete sulphation, the sulphating operation is completed by passage of the mixture from the agitator (1) through the pebble mill (2). The mixture of sulphated ore from the sulphating operation is mixed with sufficient concentrated acid from the absorber (43) (or from an external source if the aluminum is deposed of as $Al_2(SO_4)_3$) in the regulating tank (3) to bring the acid concentration in the mixture to approximately 60%. The mixture of aluminum sulphate crystals, ore residue, and 60% acid thus formed is separated in the thickener (4), the excess or circulating acid, being returned through the heater (19) to the sulphator (1) for reuse in the process, and the thickened mixture of aluminum sulphate crystals, acid and ore residue, being filtered to remove more excess acid and washed with a hot concentrated $Al_2(SO_4)_3$ solution from the thickener (7) in the filter and washer (5) to remove the residual acid as previously described (the later washes being separated and sent to the wash storage tanks (6) and (7) for use as the earlier washes in succeeding washing operations as previously described); and the first washes containing the residual acid being mixed with the circulating acid and returned to the sulphator for reuse in sulphating more ore. The washed aluminum sulphate cake from the washer (5) is mixed with hot water, preferably washes from succeeding filtering and washing operations as described, and agitated in the dissolver (6) to dissolve the aluminum sulphate. The mixture of aluminum sulphate solution and ore residue (mainly silica if clay is being treated) is separated in the thickener (7), the thickened mixture being filtered and washed on the filter (8). The filtered aluminum sulphate solution from the dewaterer (7) minus the wash solution which is sent to the washer (5) (for removal of the residual acid) and from the filter (8) is sent to the iron-manganese precipitator (45) and the more dilute wash solution to the dissolver (6) as indicated in the flow sheet. In the precipitator (45), any residual acid remaining in solution is neutralized with $CaCO_3$ or other suitable neutralizer and the iron and manganese are oxidized and precipitated by means of a suitable oxidizing agent and precipitant (such as lead peroxide and $CaCO_3$, or other suitable oxidizer). The precipitates from this cleaning operation are separated from the clean aluminum sulphate solution in the thickener (46) and filter (47) as previously described, the more dilute wash solution from the filter (47) being sent to the dissolver (6) and the pure aluminum sulphate solution being sent to the dehydrator (48). (If the solution should contain copper or other metals lower than iron in the electromotive series, they first are precipitated out in another cleaning operation by means of metallic aluminum powder.) In the dehydrator (14) (preferably of the rotor spray type) the water is evaporated, leaving the aluminum as a powder of $Al_2(SO_4)_3 \cdot H_2O$. (This product or crystals of $Al_2(SO_3) \cdot 18H_2O$ crystallized from the pure $Al_2(SO_4)_3$ solution may be marketed as the final product.) The $Al_2(SO)_3 \cdot H_2O$ from the dehydrator (48) is calcined in the calciner (49) at a low red heat to break up the salt and form $Al_2O_3$ and $SO_3$. The $SO_3$ is absorbed in return acid from the thickener (4) and returned to the sulphator (1) for the treatment of more ore as described. The absorption of the $SO_3$ is preferably carried out, as indicated in the flow sheet, in concentrated acid circulated through the concentrator, from which stream of circulating acid, concentrated acid is constantly removed equal in amount to the new acid formed and to which stream sufficient more dilute acid from the thickener (4) and washer (5) is added to supply water for combination with the $SO_3$.

Other specific examples of the application of the invention in the other processes and to the treatment of other ores and products might be given, but the foregoing are sufficient to demonstrate the very wide application and great value of the invention in the treatment of ores and other products with sulphuric acid, and in the separation and recovery of the acid and metal sulphate from the acid solutions made in these processes. From the foregoing descriptions, to those familiar with the art, the specific steps and combinations comprising the invention both in its general form and in its specific applications to different ores and solutions in different processes will be apparent; however, to avoid misconception in this regard, the following statements are added to the foregoing descriptions relating to the inventor's claims as to the nature and scope of the invention and its relationship to older processes over which its specific applications constitute valuable and important improvements:

The inventor makes no claim herein to the general process of treating ores with sulphuric acid, but only to that specific improvement in the older processes which consists in treating the ores with a limited excess of sulphuric acid in such a manner as to obtain the metal to be recovered in the form of solid metal sulphate crystals mixed with the excess acid used in the sulphating treatment. In this treatment, the operation is preferably carried out by a preliminary agitation followed by grinding, the grinding step being not merely a chemical expedient to secure complete conversion of the metal to sulphate, (since this may be secured by the use of larger quantities of excess acid) but primarily for the purpose of securing the soluble metal sulphate in solid form in mixture with a minimum of excess acid in the range of concentration in which the solubility of the metal sulphate is at a minimum. In older processes, such as those described in my U. S. Patents Numbers 1,415,797, 1,434,084, 1,435,699, etc., the relatively enormous quantity of excess or circulating acid required has prevented the economic use of the process in commercial application. In the older processes for the treatment of iron-titanium ores and clay and bauxite, the economical use of an excess of acid has been impossible owing to the lack of any efficient or feasible method of separating the excess acid from the treated ore and metal sulphate, thus securing very incomplete sulphating and requiring the return to the process of the unconverted ore for retreatment, or its loss as waste, due to the necessity of using substantially less than the amount of acid required for sulphating all the metal so as to obtain a neutral or nearly neutral product for the leaching operation. In the older processes using large excesses of acid and recovering the metal sulphate by cooling the acid concentrated metal sulphate solution, as in the processes described in my U. S. patents mentioned above, the separation of the excess acid contained in the precipitated metal sulphate from the large volume of acid used in these older processes has also been a factor militating against the commercial use of these processes, due to the lack of an efficient method of separating the acid from the metal sulphate. The cyclic heating and cooling and handling of the large volumes of excess acid used in these processes and the difficulty of separating the acid from the metal sulphate have prevented their commercial use upon a large scale. In all of these older processes, a serious difficulty in their commercial operation has been found in the treatment of the acid metal sulphate solutions formed in the processes for the separation and recovery of the metal sulphate and acid therefrom. The concentrating of the acid metal sulphate solutions by methods in common use in acid concentration have failed due to the difficulty of handling the mixture of precipitated metal sulphate and acid by these methods. The separation of the precipitated metal sulphates and the concentrated acid has hitherto not been commercially attempted owing to the fact that no efficient method of separation has been discovered and such separation has been considered infeasible. By the method of this invention, the concentration of these mixed solutions and the separation and recovery therefrom of the acid and metal sulphate may be carried out in a very simple and efficient manner as described above. The inventor makes no claim herein to any general process of concentrating solutions or separating metal salts therefrom, but only to the specific method which embraces concentrating acid sulphate solutions to the range of acid concentration in which the metal sulphate is at a minimum, so as to precipitate the metal sulphate therefrom in a form in which the acid may be separated from the solid by washing the sulphate crystals with water or with a metal sulphate solution. The combination of the method of sulphating and of the method of separating the acid from the solid metal sulphate of this invention, secures results which are entirely revolutionary in the art, constituting improvements of the highest value which make possible the commercial treatments of ores and the like with sulphuric acid in ways hitherto unknown and untried and which have been considered entirely impractical by those familiar with the art until convinced of their utility and feasibility by practical test and demonstration. The present invention differs from the older processes of treating ores and the like in which either a very large excess of acid or a deficiency of acid are used, in the specific treatment of the ores and the like with a limited excess of acid in such a manner as to convert substantially all the metal to be separated or recovered into solid metal sulphate and leave the excess acid in the range of concentration in which the solubility of the metal sulphate is at a minimum, so that substantially all the metal sulphate may be separated from the excess acid in solid form in a suitable filter cake so as to make possible the removal of the residual acid from the solid sulphate in the cake by selective washing of the cake with water or preferably with metal sulphate solution, so as to remove acid therefrom in solution and leave the metal sulphate in solid form in the cake. It differs from the older processes of treating the acid metal sulphate solutions in the similar specific treatment of these solutions so as to bring the acid concentration into the range of concentration in which the solubility of metal sulphate is at a minimum, so that substantially all the metal sulphate may be separated from the excess acid by filtration in suitable solid form in a filter cake so as to make possible the removal of the residual acid from the solid sulphate in the cake by selective washing of the cake with water or preferably with metal sulphate solution so as to remove acid in solution and leave the metal sulphate in solid form in the cake. By combination of the invention with other steps well known in the art, valuable processes, such as those described above, which secure new and revolutionary results of great value in the art are obtained, as will be apparent from the foregoing description. The term "ore" as used in the appended claims is intended to embrace concentrates, minerals and the like. Having described my invention and illustrated some of its practical uses, what I claim as new and desire to patent is:

1. The process of treating ores of metals whose sulphates are characterized by a relatively high degree of solubility in water and a relatively low degree of solubility in sulphuric acid of a range of relatively high concentration, which consists in mixing said finely divided ore with a limited excess of relatively concentrated sulphuric acid sufficient in amount to form a fluid mixture with said ore but insufficient to dissolve more than a minor fraction of the sulphates of said metals, and treating said mixture in such manner as to convert said metal in said ore into the sulphate in solid form and to bring said excess of sulphuric acid in said mixture into the range of concentration in which the solubility of said metal sulphate is near the minimum, filtering excess acid away from said treated mixture and forming a filter cake of the metal sulphate particles and ore residue thus formed, and passing water through said cake in such proportion as to remove residual excess acid from said cake in relatively large proportion and metal sulphate in not more than relatively small proportion and leave the much greater part of said metal sulphate in said cake in solid form.

2. The process of treating ores of metals whose sulphates are characterized by a relatively high degree of solubility in water and a relatively low degree of solubility in sulphuric acid of a range of relatively high concentration, which consists in mixing said finely divided ore with a limited excess of relatively concentrated sulphuric acid sufficient to form a fluid mixture with said ore but insufficient to dissolve more than a minor fraction of the said metals, and treating said mixture in such a manner as to convert said metal in said ore into the sulphate in solid form and to bring said excess of sulphuric acid in said mixture into the range of concentration in which the solubility of said metal sulphate is near the minimum, filtering excess acid away from said treated mixture and forming a filter cake of the metal sulphate particles and ore residue thus formed, and passing a solution of said metal sulphate through said filter cake in such proportion as to remove residual excess acid therefrom and leave metal sulfate in said cake in solid form, and dissolving said metal sulphate in said washed filter cake in water and separating said metal sulphate solution from the ore residue and using part of said solution in washing residual excess acid out of more filter cake as described.

3. The process claimed in claim 1 further characterized by at least one of the following: maintaining the temperature of said mixture of acid and ore at a temperature near the boiling point of said acid during said treatment of said mixture; agitating and grinding said mixture of acid and ore during said treatment; adding fresh acid of high concentration to said mixture of ore and acid to keep the excess acid in said mixture in the range of concentration in which solubility of said sulphates in said acid is near the minimum, during said treatment of said mixture; bringing the excess acid in said mixture into the lower part of the range of concentration in which the solubility of the metal sulphate is near the minimum previous to separating said excess acid from the sulphated ore; reserving the later part of the wash solution from the washing of said filter cake and using said reserved solution in the first stages of other such succeeding washing operations; agitating and working said filter cake during said filtration to secure the separation of more excess acid therefrom; bringing the excess acid filtered and washed away from said solid metal sulphate and ore residue to its original concentration and using it over again in the treatment of more ore.

4. The process of treating solutions containing sulphuric acid and a metal sulphate which is characterized by a relatively high degree of solubility in water and a relatively low degree of solubility in sulphuric acid of a range of relatively high concentration, which consists in bringing the acid in said solution into the range of concentration in which said metal sulphate is near the minimum and thereby precipitating said metal sulphate in mixture with said acid, filtering as much as practicable of said acid away from said particles of precipitated metal sulphate and forming a filter cake of said metal sulphate particles, and passing water through said cake in such proportion as to remove residual acid from said cake in relatively large proportion and metal sulphate in relatively small proportion and leave the much greater part of said metal sulphate in said cake in solid form.

5. The process of treating solutions containing sulphuric acid and metal sulphate characterized by a relatively high degree of solubility in water and a relatively low degree of solubility in sulphuric acid of a range of relatively high concentration, which consists in bringing the acid in said solution into the range of concentration in which the solubility of said metal sulphate is near the minimum and thereby precipitating said metal sulphate in mixture with said acid, filtering a large proportion of said acid away from said particles of precipitated metal sulphate and forming a filter cake of said metal sulphate particles, passing a solution of said metal sulphate through said cake in such proportion as to remove a major proportion of residual acid therefrom to and leave said metal sulphate in said cake in solid form, and dissolving part of said washed metal sulphate from said filter cake in only sufficient water to form a concentrated metal sulphate solution and using said solution for washing residual acid out of more filter cake, as described.

6. The process claimed in claim 4 further characterized by at least one of the following: bringing said acid in said treated solution into the lower part of the range of concentration in which the solubility of the metal sulphate is near the minimum previous to separating the acid from the solid metal sulphate; agitating and working said filter cake during said filtration to secure removal of more acid therefrom; reserving the later part of the wash solution from the washing of said filter cake and using said reserved solution in the first stage of other such succeeding washing operation.

7. The process of treating relatively dilute sulphuric acid solutions containing metal sulphates characterized by a relatively high degree of solubility in water and a relatively low degree of solubility in sulphuric acid of a range of relatively high concentration, which consists in concentrating said solution to bring the acid in said solution into the range of concentration in which the solubility of said metal sulphate is near the minimum and thereby precipitating said metal sulphate in mixture with said concentrated acid, filtering said acid away from said particles of precipitated sulphate and forming a filter cake of said metal sulphate particles, passing water through said filter cake in only such proportion as to remove residual acid therefrom in relatively large proportion and metal sulphate in relatively small proportion and leave much greater part of said metal sulphate in said cake in solid form.

8. The process of treating relatively dilute sulphuric acid solutions containing metal sulphates characterized by a relatively high degree of solubility in water and a relatively low degree of solubility in sulphuric acid of a range of relatively high concentration, which consists in concentrating said solution to bring the acid in said solution into the range of concentration in which the solubility of said metal sulphate is near the minimum and thereby precipitating said metal sulphate in mixture with said concentrated acid, filtering said acid away from said particles of precipitated metal sulphate and forming a filter cake of said metal sulphate particles, passing a concentrated solution of said metal sulphate through said cake in such proportion as to remove residual acid therefrom and leave said metal sulphate in said cake in solid form, and dissolving part of said washed metal sulphate from said filter cake in water to form a hot concentrated metal sulphate solution and using said solution for washing residual acid out of more filter cake, as described.

9. The process claimed in claim 7 further characterized by at least one of the following: concentrating said solution to bring the acid into the lower part of the range of concentration in which the solubility of the metal sulphate is near the minimum; returning acid separated from said precipitated metal sulphate to solution being concentrated in the later stages of said concentration to maintain sufficient acid in said operation to carry the precipitated sulphate in suspension, agitating and working said filter cake during said filtration to secure the removal of more acid therefrom; reserving the later part of the wash solution from the washing of said filter cake and using said reserved solution in the first stage of other such later washing operation.

10. The process of claim 4, applied to the treatment of solutions containing sulphuric acid and zinc sulphate.

11. The process of claim 5, applied to the treatment of solutions containing sulphuric acid and ferrous sulphate.

12. The process of claim 7 applied to solutions containing sulphuric acid and titanium sulphate.

13. The process claimed in claim 1, applied to the treatment of zinc ores.

14. The process claimed in claim 2 applied to the treatment of zinc sulphide ores and further characterized by maintaining the concentration of said excess acid near 62% and the temperature of said mixture of acid and ore near the boiling point of said acid during the sulphating treatment of said ore.

15. The process of treating ores claimed in claim 1, in which the ore treated is a zinc ore, and combined with the process of recovering the zinc by electrolysis which consists in dissolving the zinc sulphate in the filter cake from said process, in only sufficient water to form a concentrated solution of zinc sulphate and separating said solution from the ore residue, and removing impurities from said solution and electrolyzing said solution to recover metallic zinc therefrom and to form sulphuric acid in solution containing residual zinc sulphate, and concentrating said electrolyzed solution to bring the acid concentration to at least approximately 60% and thereby precipitating the residual zinc sulphate in said solution; and filtering a portion of said acid away from said precipitated zinc sulphate and forming a filter cake of said zinc sulphate particles, and passing water through said filter cake in such proportion as to remove residual acid therefrom and to leave the much greater part of said zinc sulphate in said cake in solid form, and using said acid separated from said zinc sulphate in the treatment of more zinc ore to form zinc sulphate as described, and adding the acid wash solution from last said washing operation to other electrolyzed solution to be concentrated and separated as described, and dissolving said washed zinc sulphate in said filter cake in other zinc sulphate solution during the later stages of electrolytic treatment of said solution and electrolyzing last said solution.

16. The process of treating ores as claimed in claim 2 in which the ore treated is a zinc sulphide ore, combined with the process of recovering the zinc by electrolysis which comprises the step of dissolving the zinc sulphate in the filter cake from said process in only enough water to form a concentrated zinc sulphate solution and separating said solution from the ore residue, removing impurities from said solution, and electrolyzing said solution to recover metallic zinc therefrom and to form sulphuric acid in solution still containing residual zinc sulphate in solution, and concentrating said electrolyzed solution to bring the acid concentration to at least approximately 60% and thereby precipitating the bulk of the residual zinc sulphate in said solution, and filtering a part of said acid away from said precipitate zinc sulphate and forming a filter cake of said zinc sulphate particles containing residual $H_2SO_4$, and passing pure concentrated zinc sulphate solution, as described, through last said zinc sulphate filter cake in such proportion as to remove residual acid therefrom and leave the zinc sulphate in said cake in solid form, and using said acid separated from said zinc sulphate in the treatment of more zinc ore to form zinc sulphate as described, and adding the acid wash solution from last said filtering operation to other electrolyzed solution to be concentrated and separated as described, and dissolving said washed zinc sulphate in said filter cake in other zinc sulphate solution during the later stages of electrolytic treatment of said solution and electrolyzing last said solution.

17. The process of treating ores, as covered in claim 1, in which the ore treated is a zinc ore, and the zinc sulphate produced is subjected to electrolysis in which electrolytic operation the electrolysis is continued, with addition of solid zinc sulphate to the electrolyte, until a strongly acid solution of zinc sulphate is produced, concentrating said solution until the liquid portion of the concentrated solution contains at least about 60% of $H_2SO_4$ and until a major proportion of the zinc sulphate therein is precipitated, passing the mixture of the said liquid and precipitated zinc sulphate to a filter, to filter off a substantial part of the sulphuric acid solution, and leave a cake containing solid zinc sulphate and some of said sulphuric acid solution, and washing said cake with an aqueous solution which initially does not contain sulphuric acid to a degree approaching 60%; said process being further characterized by adding one at least of the following: agitating and working said zinc sulphate filter cake during filtration to secure the removal of more acid therefrom; reserving the later part of the wash solution from the washing of said zinc sulphate filter cake and using said reserved solution in the first stage of the washing of more such filter cake; mixing acid separated from said precipitated zinc sulphate with other electrolyzed acid zinc sulphate solution being concentrated to maintain sufficient acid during the later stages of said concentration to carry the precipitated zinc sulphate in suspension.

18. The process claimed in claim 1, applied to the treatment of iron-titanium ores, combined with the process of recovering the metal oxides and sulphuric acid from the metal sulphates which consists in dissolving the iron and titanium sulphates in the filter cake from above said processes in water and separating said solution from the ore residue, reducing any ferric iron in said solution to the ferrous condition, boiling and hydrolyzing said solution to precipitate the titanium therefrom as a hydrated oxide and to form sulphuric acid in solution, and separating said acid ferrous sulphate solution from said precipitated titanium oxide, and concentrating said acid ferrous sulphate solution to bring the acid concentration to approximately 62% and thereby precipitating the ferrous sulphate from said solution, and filtering said concentrated acid away from said precipitated ferrous sulphate and forming a filter cake of said ferrous sulphate particles, and passing water through said filter cake in such proportion as to remove the residual acid therefrom in relatively large proportion and the ferrous sulphate in relatively small proportion and leave the much greater part of said ferrous sulphate in said cake in solid form, and using said acid separated from said ferrous sulphate in the treatment of more ore as described, and adding the acid wash solution from last said washing operating to other acid ferrous sulphate solution to be concentrated and separated as described, and calcining said washed ferrous sulphate to decompose it and form iron oxide and $SO_3$, and combining said $SO_3$ with excess acid used in the process to form concentrated sulphuric acid and using said acid in the treatment of more ore.

19. The process claimed in claim 2, applied to the treatment of iron-titanium ores combined with the process of recovering the metal oxides and sulphuric acid from the metal sulphates which consists in dissolving the iron and titanium sulphates in the filter cake from said processes in water and separating said solution from the ore residue, and (after reducing any iron in said solution to the ferrous condition) boiling and hydrolyzing said solution to precipitate the titanium therefrom as a hydrated oxide and to form sulphuric acid in solution, and separating said acid ferrous sulphate solution from said precipitated titanium oxide, and concentrating said acid ferrous sulphate solution to bring the acid concentration to approximately 62% and thereby precipitating the ferrous sulphate from solution, and filtering said concentrated acid away from said precipitated ferrous sulphate and forming a filter cake of said ferrous sulphate particles, and passing a ferrous sulphate solution through said filter cake in such proportion as to remove residual acid therefrom and leave ferrous sulphate in said cake in solid form, and using said acid separated from said ferrous sulphate in the treatment of more ore as described, and dissolving part of said washed ferrous sulphate in water to form a concentrated ferrous sulphate solution and using said solution to wash more ferrous sulphate filter cake as described, and calcining the remainder of said ferrous sulphate in said washed cake to decompose it and form iron oxide and $SO_3$ and combining said $SO_3$ with excess acid used in the process to form concentrated sulphuric acid and using said acid in the treatment of more ore.

20. The process of claim 1, applied to the treatment of iron-titanium ores with the formation of an iron sulphate and titanium sulphate filter cake and at a later stage, a ferrous sulphate press cake, further characterized by at least one of the following: agitating and working the ferrous sulphate filter cake during filtration to secure the removal of more acid therefrom; reserving the later part of the wash solution from the washing of said ferrous sulphate filter cake and using said reserved solution in the first stage of the washing of more such filter cake; mixing acid separated from the precipitated ferrous sulphate with other acid ferrous sulphate solution being concentrated in order to maintain sufficient acid during the later stages of said concentration to carry the precipitated ferrous sulphate in suspension.

21. The process of claim 1, applied to the treatment of aluminum ores.

22. The process claimed in claim 2, applied to the treatment of aluminum ore, combined with the process of recovering the aluminum oxide and sulphuric acid which consists in mixing the washed filter cakes from above processes with water to form a concentrated aluminum sulphate solution and separating said solution from the ore residue and precipitating impurities therefrom, and dehydrating said solution to secure the aluminum sulphate in solid form, and calcining said aluminum sulphate to decompose it and form aluminum oxide and $SO_3$ and combining said $SO_3$ with excess acid used in the process to form concentrated sulphuric acid and using said acid in the treatment of more ore.

23. In the separation of water-soluble precipitated metal sulphates from relatively concentrated sulphuric acid by filtration, the steps of agitating and working the filter cake during filtration to secure the removal of more sulphuric acid therefrom.

24. In the concentration of solutions containing sulphuric acid and water-soluble metal sulphates to precipitate the metal sulphate therefrom, filtering concentrated acid away from said precipitated metal sulphate and mixing sufficient of said acid with other acid metal sulphate solution being concentrated, containing a much higher ratio of metal sulphate to acid, in the later stages of said concentrating operation to maintain in the liquor enough acid to keep the precipitated sulphates in suspension during said operation.

25. In the separation of residual acid from mixtures of concentrated acid and water-soluble sulphates precipitated from said acid, washing the metal sulphate filter cake made by filtration of said mixture with a sulphate solution of the same metal as that in the precipitated sulphate, in which sulphate solution any free acid is initially far below the concentration of the free acid initially in said filter cake.

26. A process of treating a fluent mixture comprising a metal sulphate of the class which is readily soluble in water but is not more than very slightly soluble in a relatively concentrated sulphuric acid of some particular range of concentration, which mixture contains only enough of sulphuric acid of a concentration within said range, to be incapable of dissolving more than a minor fraction of the said sulphate present, which process comprises the steps of filtering excess acid away from said mixture and thereby forming a filter cake containing said metal sulphate, with a much smaller proportion of free acid than did said fluent mixture operated upon, and thereafter passing an aqueous liquid incapable of neutralizing said acid and incapable of destroying said metal sulphate, through said cake, in such proportion as to wash out a major part of the free acid in said cake, but to leave all but a minor fraction of said metal sulphate, in said cake, any sulphuric acid in said aqueous liquid being initially present in a percentage which is only a small fraction of the percentage of sulphuric acid initially present in the said excess acid.

27. A process of treating a fluent mixture comprising a metal sulphate of the class which is readily soluble in water but is not more than very slightly soluble in a relatively concentrated sulphuric acid of some particular range of concentration, which mixture contains only enough of sulphuric acid of a concentration within said range, to be incapable of dissolving more than a minor fraction of the said sulphate present, which process comprises the steps of filtering excess acid away from said mixture and thereby forming a filter cake containing said metal sulphate, with a much smaller proportion of free acid than did said fluent mixture operated upon, and thereafter passing through said cake an aqueous liquid selected from the herein described group consisting of water, water initially containing metal sulphate of the kind contained in said cake, and water initially containing said metal sulphate and sulphuric acid, but of much lower acid concentration than said excess acid initially present in said cake, and continuing such treatment with said aqueous liquid until a major part of said excess acid is removed from said cake, but not more than a very minor fraction of the metal sulphate initially in said cake has dissolved.

NIELS C. CHRISTENSEN.

Certificate of Correction

Patent No. 2,001,409.  May 14, 1935.

NIELS C. CHRISTENSEN

It is hereby certified that error appears in the printed specification of the above numbered patent requiring correction as follows: Page 1, second column, line 3, for "acid excess" read *excess acid;* page 2, second column, line 62, strike out the formula and insert instead $Al_2(SO_4)_3.12H_2O$; and line 63, for "10%" read *30%*; page 4, second column, line 50, insert a parenthesis after "vacuum" and line 51, strike out the parenthesis mark after the syllable "ratus"; page 8, second column, line 24, for "(12)" read *(31)*; and line 35, after "concentrated" insert the word and number *in 10;* page 9, second column, line 31, for "first are" read *are first;* page 10, second column, lines 74-75, claim 1, strike out the words "in solid form"; page 11, second column, line 26, claim 5, for "to and" read *and to;* and page 12, second column, line 7, claim 16, for "step" read *steps;* and line 21, of same claim, for "precipitate" read *precipitated;* and that the said Letters Patent should be read with these corrections therein that the same may conform to the record of the case in the Patent Office.

Signed and sealed this 18th day of June, A. D. 1935.

[SEAL]

LESLIE FRAZER,
*Acting Commissioner of Patents.*